May 29, 1945.   C. F. SHAFFER   2,376,942
RESILIENT SUSPENSION FOR TRACTION WHEELS OF VEHICLES
Original Filed Sept. 5, 1939   2 Sheets-Sheet 1
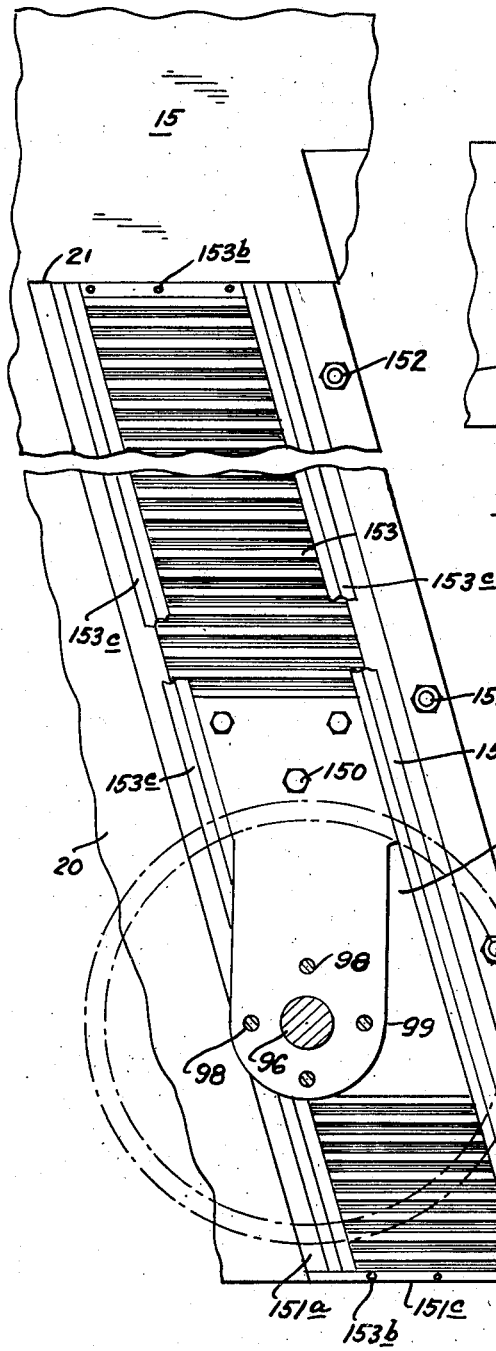
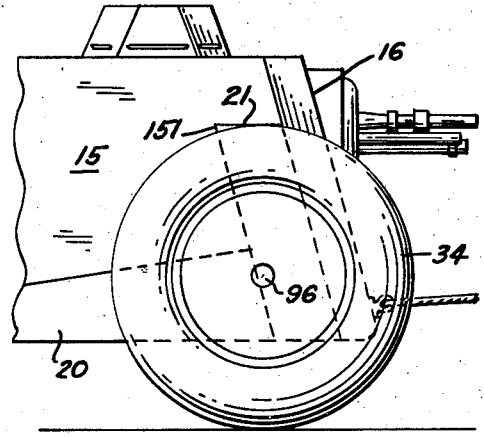
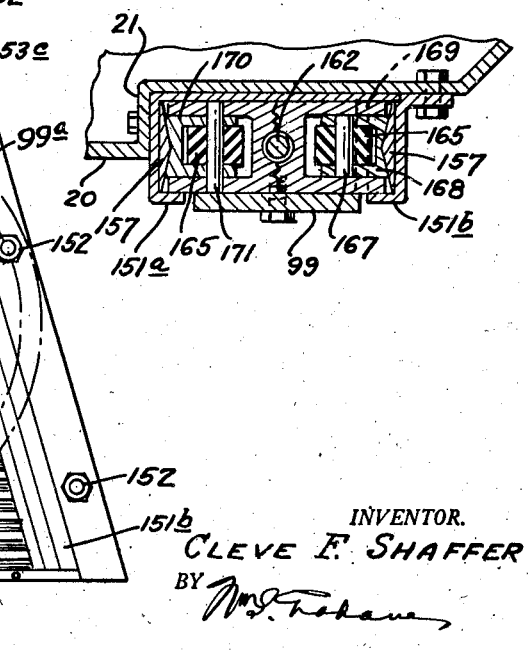
INVENTOR.
CLEVE F. SHAFFER May 29, 1945. C. F. SHAFFER 2,376,942
RESILIENT SUSPENSION FOR TRACTION WHEELS OF VEHICLES
Original Filed Sept. 5, 1939 2 Sheets-Sheet 2
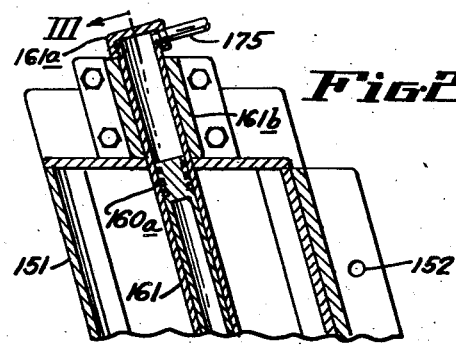
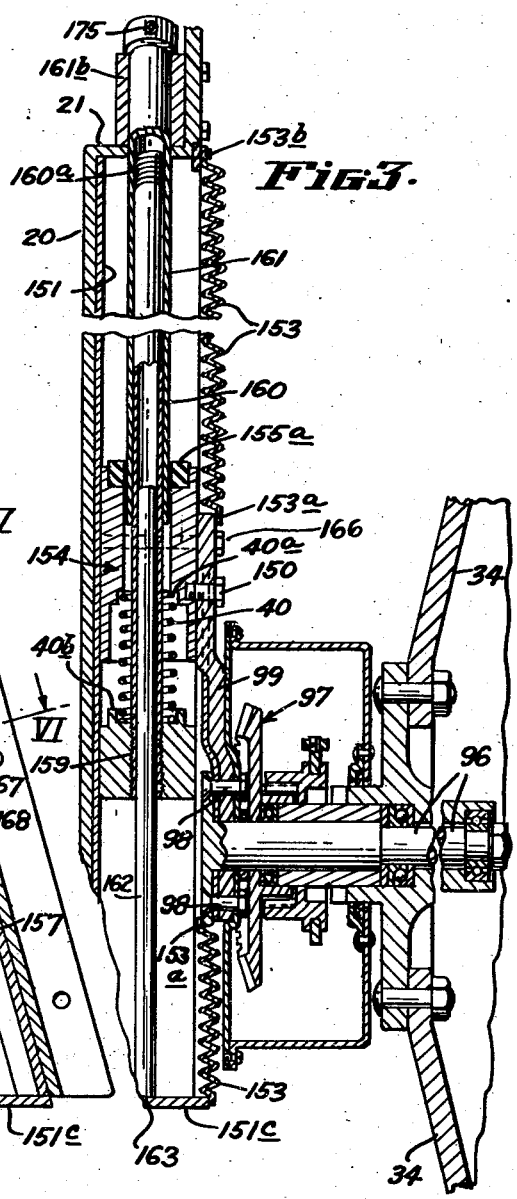
INVENTOR.
CLEVE F. SHAFFER
BY Patented May 29, 1945

2,376,942

UNITED STATES PATENT OFFICE 2,376,942

RESILIENT SUSPENSION FOR TRACTION WHEELS OF VEHICLES

Cleve F. Shaffer, San Francisco, Calif., assignor of three-eighths to Pacific Coast Mortgage Company, a corporation of California, and two-eighths to Herbert W. Erskine, Piedmont, Calif.

Original application September 5, 1939, Serial No. 293,369. Divided and this application April 23, 1943, Serial No. 484,274

7 Claims. (Cl. 280—44)

This invention relates to resilient suspension between wheels and bodies of vehicles. It is especially adaptable and advantageous for pleasure, commercial, agricultural and military vehicles, in that a new method of lessening shocks from obstructions, holes, etc., is provided, thus giving superior riding comfort, longer vehicle life, efficiency and lower construction cost, as no large and heavy axles are required.

This application is a division of my co-pending application, Ser. No. 293,369, filed September 5, 1939, for "Military tank," Patent No. 2,317,412, issued April 27, 1943. It is also obvious that a vehicle with an optional mechanism which permits travel or maneuver along the slope of a hill, such as an agricultural or military vehicle, will have great advantages over vehicles which have difficulty or cannot traverse such terrain.

It is well known that vehicles which must be employed in traversing rough uneven terrain should have resilient wheel suspension. This is particularly true of military and agricultural vehicles which frequently must travel where there are no prepared roads, and frequently at relatively high speed. Military vehicles frequently must carry injured soldiers, delicate instruments or explosives, or may be employed as an armored vehicle or "tank" which must have a reasonably steady plane for accuracy in aiming and firing weapons. While the invention is described with particular reference to vehicles which normally have ground traction, it is also advantageous as a resilient wheel suspension for landing wheels of airplanes, and in fact in any type of light or heavy vehicle in which it is desired to provide a resilient wheel suspension.

It is advantageous to provide in the suspension mechanism of any vehicle means whereby both the horizontally and vertically acting forces of impact will be absorbed by splitting the impact in such manner as to lessen its effect upon the suspension mechanism, the power unit, and in fact all the mechanical parts, as well as the occupants.

Another desirable object is to provide for optionally raising and lowering the vehicle body relative to traction surface to effect greater clearance in rough terrain, or to provide a lower swung body with less ground clearance for high speed, and to obscure a military vehicle in moving through brush country and low rolling hills, or to raise or lower a wheel, or wheels, on one side of vehicles, as for instance on the side of a hill, so that the vehicle body remains level.

It is also an object to provide for braking, snubbing and slowing the action of the suspension mechanism.

Having in view the accomplishment of the foregoing and other objects, all of which will be more apparent as this description proceeds, the invention is exemplified in one form in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawings, wherein:

Fig. 1 is a fragmentary portion of wall of a light armored vehicle diagrammatically illustrative of positioning of the wheel suspension mechanism.

Fig. 2 is a vertical longitudinally transverse section on line II—II of Fig. 3, of the suspension mechanism for supporting the vehicle body relative to the wheel.

Fig. 3 is a vertical laterally transverse section of the suspension mechanism shown in Fig. 2 on III—III.

Fig. 4 is a horizontal section on line IV—IV of Fig. 2.

Fig. 5 is a front elevation of the suspension mechanism, though it is a side elevation of the vehicle.

Fig. 6 is a transverse section on line VI—VI of Fig. 2.

In order more readily to tie the description herein with comparable descriptive matter in my said co-pending application, Ser. No. 293,369, the reference characters employed for corresponding parts in that application have been similarly employed herein.

Referring to the drawings in which like characters of reference indicate corresponding parts in the several views, 15 indicates generally a fragmentary portion of one form of vehicle body, which, as here illustrated, is a light military vehicle of suitable armor material, in which the front wall 16 is inclined upwardly and rearwardly from bottom to top at an angle to the vertical. The side walls 20 of body 15 are provided adjacent the wheel with a vertical elongated recess 21 for receiving the vertical adjustment wheel suspension mechanism.

The wheel to which the resilient suspension is applied is generally indicated 34. The details of construction of the wheel and its anti-friction bearings, and its driving mechanism, if it be a drive wheel, not being peculiar or specific to this invention, are not described in detail, though its axle is generally indicated 96 and its drive mechanism and clutch are generally included without detailed description with a protective housing drum therefor, the assembly being indicated 97. While the wheels of the vehicle are referred to herein as traction wheels, it is to be understood that such term is used generically to mean any of the running wheels of a vehicle and is not restricted to driving or impelling wheels.

As best shown in Fig. 3, the wheel axle and its driving mechanism is mounted by bolts 98 on a hanger bracket 99, the latter being secured as by bolts 150, to a vertically movable suspension mechanism. While the suspension mechanism may be mounted at a true vertical, it is preferred that it be mounted at an incline rearwardly from bottom to top as herein illustrated and described because the shock of impact when passing over an obstacle or hole is divided vertically and horizontally, thus limiting the vertical raise of body as well as the horizontal shock.

The suspension mechanism is mounted in a housing or casing 151 which conveniently may fit into a rearwardly inclined recess 21 of the body 15, thereby being positioned with its longitudinal axis angularly disposed to the laterally transverse vertical plane of the vehicle, and being tilted rearwardly from bottom to top, thus absorbing thrust both vertically and horizontally for better stabilization of the body when moving over uneven ground. While the suspension mechanism is described as to one wheel, it will be understood that it may be similar in respect of any number of wheels. The walls of the housing 151 may be in two parts as shown at 151a and 151b and having bottom closure 151c. The housing is bolted to the vehicle body 15 through flange holes as at 152.

Suitable means are provided to exclude dirt and dust from the housing. The outer face of the housing which is adjacently spaced from and parallel to the vertical plane of the wheel by bracket 99 comprises an expandable and contractable bellows 153. This bellows is divided into two sections, one above and one below the hanger bracket 99, the adjacent ends of the bellows being connected as at 153a, to a plate member 99a which is a part of and moves with the hanger bracket, and the extreme opposite ends of the bellows are connected at the opposite ends of the housing 151 as at 153b, thereby providing for a flexible and extendable outer side wall to said housing with the hanger bracket 99 and its plate 99a intermediate its ends, thereby closing that face of the casing against entry of dirt and dust. The edges of the hanger plate 99a and the edges of the flexible bellows may be guided under flanged guide plates 153c, which are shown only fragmentarily, since there is nothing novel in such guide members per se.

A vertically movable wheel supporting mechanism, generally indicated 154, is slidably positioned within the housing 151. This slidable wheel supporting mechanism is divided into an upper portion termed a carrier 155 and a normally substantially stationary, through adjustable, lower member termed an anchor block or cross-block 156. The carrier 155 rides on tracks 157 which are longitudinally disposed along the inner face of the lateral front and rear walls of the casing 151, the carrier having anti-friction roller bearings 158 for that purpose.

If it is not desired to provide for elevating or lowering the vehicle wheels relative to vehicle body, the anchor or cross-block 156 may be fixedly mounted in the casing. But for accomplishing this advantage of such elevating and lowering of the vehicle wheels, means have been provided. For such purpose the lower member or anchor block 156 of the suspension mechanism is connected fixedly as at 159 to the free end of an elongated hollow piston 160 having packing head 160a. The piston 160 may slidably reciprocate in a cylinder 161, the head of which is closed by cap 161a, and the reciprocation being responsive to hydraulic liquid pressure. The cylinder and piston may slidably pass through circular opening 155b in carrier 155, the piston being stabilized and guided at its lower portion by an inner guide tube or rod 162 secured to the bottom wall of the housing as at 163 and which extends upwardly into the elongated hollow piston in which it slides. The anchor or cross-block 156 is selectively placed and held in position by the compression of hydraulic or pneumatic, but preferably hydraulic, fluid pressure in the head of cylinder 161 against the packing head of piston 160, which, in turn, through the suspension mechanism herein described, supports the weight of the vehicle and predetermines the clearance desired between the floor of the vehicle and the road or traction surface.

Circumferentially of the piston 160 and between the relatively spaced carrier 155 and block 156, a compression coil snubber spring 40 is provided to resiliently absorb the downward rebound thrust of the weight of the vehicle body. The opposite ends of spring 40 bear respectively in recesses at the lower end of carrier 155 and upper end of piston block 156 as at 40a and 40b, being fixedly secured therein. The upward thrust of the wheels relative to the body is resiliently absorbed in resilient snubber members which may be any suitable spring means, and as here exemplified comprise heavy rubber loop members 165. These resilient members 165 are mounted at their upper ends around transverse bolt members 166 in the carrier 155 and at their opposite ends on cross wrist bolts 167 in block 156. In the carrier 155 bolts 166 may extend through the body thereof, whereas in the block 156, the wrist bolts 167 are mounted in one end portion of bifurcated cams 168 which in turn are pivotally mounted in pivot pins 169, which are secured in the block 156 offset from the bolts 167. Therefore, the cam faces are increasingly pressed against track 157 as the rubber loop springs 165 are increasingly tensioned, thereby providing an additional braking means for holding a selected position for the block 156 under upward throw of the vehicle body under driving shock.

The carrier member 155 is also provided with an auxiliary mechanical braking means against vertical movement, consisting of the cams 170 which are pivotally mounted on the carrier 155 by pins 171, which pass through the upper portion of the rubber loops 165. The cams 170 also have two arms which straddle the rubber loops and the arms are transversely connected by a shoe 170a, which overlies the outer face of the rubber loop. On upward movement of the carrier 155 the faces of the shoes are pressed against the tracks 157 by the tautening of the looped rubber spring members, which press increasingly, when increasingly tensioned, against shoe 170a of the cam. On the rebound downward movement of the carrier these cam shoes have an additional wedge action against the tracks to resist the recoil of the carrier until the loops resume their normal position and the abnormal tautening of the loops is no longer effective.

These cams do not, however, prevent the intended upward and downward adjustment of the block 156 and carrier 155 by the cylinder 161 and piston 160, because the pressure faces of cams 168 and shoe 170a are so formed, and the pivot pins 169 and 171 are so positioned with relation to loops 165, that the loops 165 and coil spring 40, as originally formed, are of sufficient strength and resistance to support the weight of the vehicle body while maintaining the cams at a normal position at which they are ineffective to accomplish a braking effect.

It will be noted that the block and carrier are in spaced relation, ordinarily separated by the weight of the vehicle on the rubber loops or springs 165 and the snubber coil spring 40, but are flexibly connected by the resilient rubber loops and spring. Therefore, the carrier and block are movable in unison for adjustment by movement of the piston 160. The piston 160 is actuated to a predetermined selective position in any suitable manner, such as the hydraulic pressure introduced through conduit 175 which communicates with the upper end of cylinder 161, and extends to any suitable pressure source, preferably a pump operated by the motor of the vehicle, where it is regulated by the vehicle operator through any suitable valve, the pump and valve being conventional, and not being shown in the drawings.

It will thus be observed that each wheel mounted on a hanger bracket 99 which in turn is secured to the carrier member, and is adjustable to a selected normal position, and that the operating shocks and vibration of upward thrust and downward rebound will be absorbed in the respective rubber loop snubbers 165, rebound snubber spring 40 and cam brake snubbers 168 and 170.

Where the wheel suspension mechanism is employed in a military vehicle, it is desirable that the cylinder 161 and its pressure conduit 175 extend upwardly through the top wall of recess 21 and into the vehicle body for convenient access of pressure conduit 175 from within the vehicle and also for protective purposes of the pressure tube. In such positioning, the cylinder 161 is fixedly mounted to the inner wall of the body 15 by a clamp 161b bolted to the body wall.

It will be noted also that each of the entire wheel suspension mechanisms may be either independently or simultaneously raised or lowered relative to the vehicle body. By raising or lowering the suspension mechanism different amounts on opposite sides of the vehicle, it is possible to operate the vehicle along the side of a hill or over sharply sloping or inclined ground and yet maintain the plane of the vehicle body substantially horizontal.

Emergency bumper blocks 155a may be mounted at the upper end of the carrier 155 to operate in the usual manner of contacting the upper closure of the casing under extreme conditions of wheel impact or if the suspension mechanism should become broken or damaged to an extent which would render it ineffective.

Having thus described the invention, I claim:

1. A suspension apparatus for supporting a vehicle body relative to traction wheels thereof, comprising a housing for mounting on the vehicle body; means in the housing for selectively raising and lowering the vehicle body relative to the axles of traction wheels and including a pressure cylinder member adapted for receiving a pressure fluid in one end portion thereof, and a piston member reciprocable in the cylinder, one of said members having a supporting connection to the vehicle body, a wheel supporting mechanism slidable in the housing and connected to the other of said members, said wheel supporting mechanism including a cross-block fixedly mounted at the free end of the said other member, a following carrier resiliently connected to and spaced from said block and having means for mounting a traction wheel thereto, and resilient means connecting said block and said carrier whereby said carrier may slide in the housing in unison with and independently of the cross-block, and braking means operated by tensioning of said resilient means for resisting relative movement of block and carrier.

2. A device having the elements of claim 1 and wherein said resilient means includes a coil spring connected to the block and carrier and a second resilient means comprising a pair of elastic loops connecting the block and carrier.

3. In combination with the side wall of a vehicle body which has an inset recess inclined rearwardly from bottom to top, a housing for mounting in said recess, means in the housing for selectively raising and lowering the vehicle body relative to the axles of traction wheels, said means being inclined rearwardly from bottom to top and including a pressure cylinder member adapted for receiving a pressure fluid in one end portion thereof, and a piston member reciprocable in the cylinder, one of said members having a supporting connection to the vehicle body, and a wheel supporting mechanism slidable in the housing and connected to the other of said members whereby the said wheel supporting mechanism may be raised and lowered by relative reciprocation of piston and cylinder.

4. A device having the elements of claim 3 and wherein said wheel supporting mechanism includes a cross-block fixedly mounted at the free end of the said other member, a following carrier resiliently connected to and spaced from said block and having means for mounting a traction wheel thereto, said carrier being slidable in the housing, and resilient means connecting said block and said carrier including a coil spring connected to the block and carrier, and a second resilient means comprising a pair of elastic loops connecting the block and carrier.

5. A suspension apparatus for supporting a vehicle body relative to traction wheels thereof, comprising a housing for mounting on the vehicle body, means in the housing for selectively raising and lowering the vehicle body relative to the axles of traction wheels and including a cylinder member having a supporting connection to the vehicle body, a piston member adjustably reciprocable in the cylinder, and a wheel supporting mechanism slidable in the housing and connected to the piston member whereby the wheel supporting mechanism may be raised and lowered by relative reciprocation of the piston and cylinder, said wheel supporting mechanism including a cross-block fixedly mounted at the free end of said piston member and a following carrier resiliently connected to and spaced from said block and having means for mounting a traction wheel thereto, said following carriers being slidable in the housing in unison with and also independently of said cross-block.

6. A suspension apparatus for supporting a vehicle body relative to traction wheels thereof, comprising a housing for mounting on the vehicle body, means in the housing for selectively raising and lowering the vehicle body relative to the axles of traction wheels and including a cylinder member having a supporting connection to the vehicle body, a piston member adjustably reciprocable in the cylinder, and a wheel supporting mechanism slidable in the housing and connected to the piston member whereby the wheel supporting mechanism may be raised and lowered by relative reciprocation of the piston and cylinder, said wheel supporting mechanism including a cross-block fixedly mounted at the free end of said piston member and a following carrier resiliently connected to and spaced from said block and having means for mounting a traction wheel thereto, and resilient means connecting said block and said carrier for resisting the thrust of upward and downward movement of the wheel-mounting carrier relative to the cross-block.

7. A suspension apparatus for supporting a vehicle body relative to traction wheels thereof, comprising a housing for mounting on a vehicle body, means in the housing for selectively raising and lowering the vehicle body relative to the axles of traction wheels and including a pressure cylinder member adapted for receiving a pressure fluid in one end thereof and having a supporting connection to the vehicle body, means to admit a pressure fluid into one end of said cylinder, a piston member adjustably reciprocable in the cylinder, and a wheel supporting mechanism slidable in the housing and connected to the piston member whereby the wheel supporting mechanism may be raised and lowered by relative reciprocation of the piston and cylinder, said wheel supporting mechanism including a cross-block mounted at the free end of said piston and a following carrier resiliently connected to and spaced from said block and having means for mounting a traction wheel thereto, and resilient means connecting said block and said carrier for resisting upward and downward thrust of the wheel mounting carrier relative to the cross-block.

CLEVE F. SHAFFER.